United States Patent [19]

Coussau

[11] Patent Number: 4,650,638

[45] Date of Patent: Mar. 17, 1987

[54] METHOD FOR ELIMINATING LEAKAGE SPACES BETWEEN THE PARTITIONS SURROUNDING THE CORE OF A PRESSURIZED WATER NUCLEAR REACTOR

[75] Inventor: Jean Coussau, Paris, France

[73] Assignee: Framatome & Cie., Courbevoie, France

[21] Appl. No.: 702,198

[22] Filed: Feb. 15, 1985

Related U.S. Application Data

[60] Continuation of Ser. No. 662,808, Oct. 22, 1984, Division of Ser. No. 395,380, Jul. 6, 1982, abandoned.

[30] Foreign Application Priority Data

Jul. 30, 1981 [FR] France .................................. 81 14899

[51] Int. Cl.⁴ .............................................. G21C 11/00
[52] U.S. Cl. ..................................... 376/260; 376/287; 376/399
[58] Field of Search ............... 376/260, 287, 361, 377, 376/389, 399, 390, 400

[56] References Cited

U.S. PATENT DOCUMENTS

| | | | |
|---|---|---|---|
| 3,356,589 | 12/1967 | Grell et al. ........................... | 376/399 |
| 3,720,581 | 3/1973 | Kaser .................................... | 376/287 |
| 4,080,255 | 3/1978 | Rylatt .................................... | 376/400 |
| 4,080,257 | 3/1978 | Machado et al. ................... | 376/400 |
| 4,158,605 | 6/1979 | Cooper, Jr. et al. ................ | 376/400 |
| 4,421,715 | 12/1983 | Gunter et al. ........................ | 376/260 |

*Primary Examiner*—Harvey E. Behrend
*Attorney, Agent, or Firm*—Pollock, Vande Sande & Priddy

[57] ABSTRACT

A method and apparatus for eliminating leakage spaces between the partitions (1) surrounding the core of a pressurized water nuclear reactor, after it is brought into operation. Operations are carried out under water, during shutdown of the reactor. The defective joins (12) between the partitions (1) are identified. For each join, the partitions (1) are pierced, the hole inside a partition (1) is screw-threaded, the swarf is recovered, a screw with diametrical expansion is introduced and screwed into the hole and the screw is expanded by displacement of a rod in the longitudinal direction of the screw. Moving location, the operations are repeated for each defective join (12). The apparatus comprises a case (25) containing a drum (36) bearing tools for boring (54–65), screw-threading, and screwing, a cleaning tube and a punch for locking the screw.

1 Claim, 16 Drawing Figures

METHOD FOR ELIMINATING LEAKAGE SPACES BETWEEN THE PARTITIONS SURROUNDING THE CORE OF A PRESSURIZED WATER NUCLEAR REACTOR

FIELD OF THE INVENTION

The invention concerns a method and an apparatus for eliminating leakage spaces between the partitions surrounding the core of a pressurized water nuclear reactor, after this nuclear reactor is brought into operation.

BACKGROUND

In pressurized water nuclear reactors, the core of the reactor is constituted by very long, square-sectioned fuel assemblies constituted by a bundle of rods containing the fuel material and disposed side by side, vertically and in contact at their side faces.

The transverse section of the core constituted by the juxtaposition of the square sections of the various assemblies is shaped like an irregular polygon whose perimeter has many steps.

The whole of the reactor core is held inside partitioning, in contact with the outwardly directed faces of the peripheral assemblies, over the whole height of these assemblies.

The core and its partitioning are also surrounded by a cylindrical shell, termed core casing, which provides a space, between the partitioning and its inner surface, inside which horizontal reinforcing plates are positioned ensuring that the partitioning, which is itself constituted by flat plates almost as long as the height of the core, is assembled and kept in position.

The reinforcing plates are pierced by openings allowing cooling water to circulate in the space between the partitioning and the core casing.

It is necessary in practice to cool the partitioning by the calculation of water over its outer surface and this cooling water can be introduced at the upper part of this space via water inlet orifices provided in the core casing.

As it circulates, the pressurized cooling water of the reactor enters the core via its lower part, passes through the assemblies vertically from bottom to top and is collected by the hot branches of the primary circuit at the upper part of the core. On its return, the cooling water from the partitioning runs through the space between the partitioning and the core casing, vertically from top to bottom before combining with the water entering the core at the lower part thereof. The loss of head of the pressurized water when it runs through the interior of the assemblies, depending on the height of the core, produces a difference in pressure, at the upper part of the core, between the water for cooling the core and the water for cooling the partitioning. In the case of cooling the partitioning by descending current, this difference in pressure is of the order of 2 bars.

The vertical plates constituting the partitioning are simply juxtaposed and assembled at right angles by screws.

In some pressurized water nuclear reactors currently operating, the assembly between some partitions has only a small number of screws, so that a leakage space can occur between the corresponding partitioning elements.

Because of the difference in pressure existing, at least at the upper part of the partitioning, between the core region and the peripheral region between the partitioning and the core casing, pressurized jets of water directed from the exterior to the interior of the core create regions of turbulence in the neighbouring assemblies and cause vibrations in the rods adjacent to these leakage regions which can cause them to deteriorate in the long run.

To solve this problem, an attempt has been made to reduce the leakage spaces between such partitions, inside nuclear reactors, by hammering the joints between partitions responsible for these phenomena.

Such a hammering operation must be carried out during a reactor shutdown, under water, with special tooling since the reactor materials are contaminated after use of this reactor. Before the hammering operation, the joints with too great play must be identified and then, after hammering, a check must be made that the play is sufficiently small to practically eliminate the occurrence of pressurized jets through the partitioning.

These operations are therefore relatively complex and take a long time. In addition, when the reactor is in service, the joints can be displaced again so that the pressurized jets are very likely to reappear some time after the hammering operation.

SUMMARY OF THE INVENTION

The object of the invention is therefore to propose a method of eliminating leakage spaces between the partitions surrounding the core of a pressurized water nuclear reactor, after this reactor has been brought into operation, in which the core constituted by vertically disposed prismatic fuel assemblies is surrounded over its entire height by vertical flat partitions connected at right angles in pairs so as to constitute a partitioning whose horizontal section inside the circular section of the cylindrical casing of the core is a polygon contiguously surrounding the core whose horizontal section is correspondingly shaped, the partitions being assembled by horizontal reinforcing pieces disposed between the outer surface of the partitions and the inner surface of the core casing pierced with openings allowing the circulation of water, vertically, in the space provided between the partitioning and the core casing, this method allowing the leakage spaces to be permanently eliminated without deforming the partitions.

To achieve this, during a reactor shutdown and with the core under water:

(a) the joins between two right-angled partitions, between which a leakage space is capable of creating a leakage of cooling water when the reactor is operating, in the direction of the core, are identified and then, in the case of each join, (b) a first bore is made in the two partitions where they join, the bore passing through the entire thickness of one of the two partitions and opening in the other partition, in the direction of its width, (c) the bore in the first partition is widened to form a housing with a bearing surface perpendicular to the bore, (d) the interior of the bore is screw-threaded over part of its length, inside the second partition, (e) the swarf is recovered, (f) a screw with diametrical expansion is introduced and screwed in the bore until a tightness reducing the play at the screw is obtained, the screw-head bearing on the bearing surface inside the housing, (g) the screw is expanded by displacement of a rod inside this, in the longitudinal direction, (h) operations (b) to (g) are repeated at certain locations along the join between the two partitions until the leakage is insignificant, and then at the other identified joins.

To fully explain the invention, the partitioning of the core of a pressurized water nuclear reactor which is the type liable to have leakage spaces and an apparatus allowing leakage spaces in this partitioning to be eliminated will now be described, as well as an operation for eliminating leakage spaces in the partitioning using the apparatus described.

DETAILED DESCRIPTION

Figure 1:
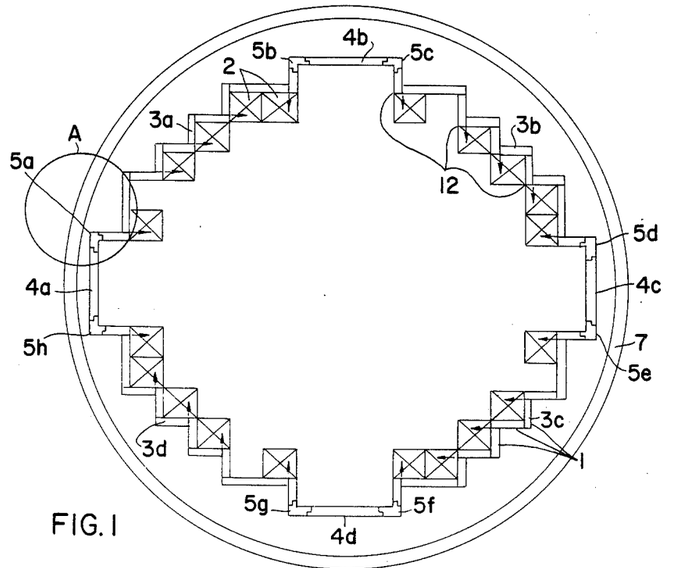
FIG. 1 is a sectional view at a horizontal plane through the partitioning of the reactor core.
Figure 2:
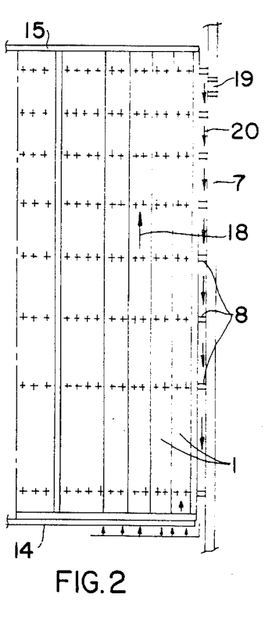
FIG. 2 is a sectional view at a vertical plane through this partitioning.

FIGS. 1 and 2 show a partitioning constituted by vertical flat partitions 1 assembled at right angles and contiguously disposed with respect to the outer side faces of the peripheral assemblies 2 of the reactor core.

FIG. 1 shows that the partitioning is constituted by four preassembled stepped parts 3a, 3b, 3c and 3d and four flat parts 4a, 4b, 4c and 4d assembled by means of eight angle pieces 5a to 5h.

The partitioning containing the core is itself surrounded by the core casing 7 constituted by a cylindrical shell with a height greater than the height of the core.

FIGS. 1 and 2 show that, between the partitions 1 and the core casing 7, horizontal reinforcing pieces 8 are disposed whose spacing decreases from the bottom part to the top part of the core.

Figure 3:
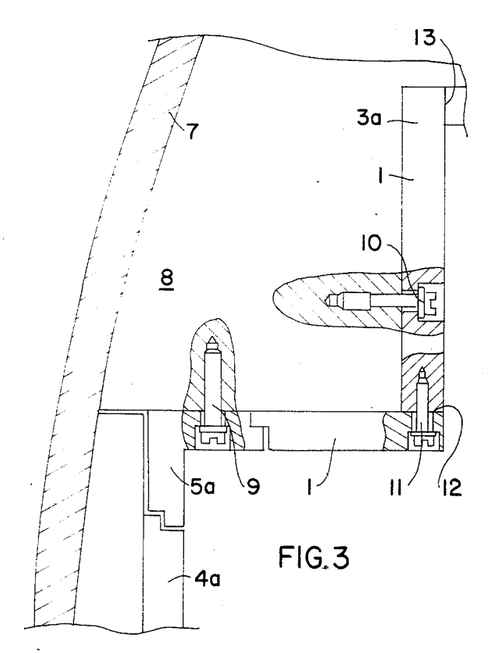
FIG. 3 is an enlarged view of Detail A of FIG. 1.

FIG. 3 shows that the angle pieces 5 are fixed to the reinforcing pieces 8 by screws 9 and that the partitions 1 are themselves fixed on these reinforcing pieces 8 by screws 10.

The partitions 1 are fixed together where they join at right angles such as 12 in FIG. 3, by means of screws 11 passing through the whole thickness of one of the partitions and entering and screwing into the other partition in the direction of its width.

FIG. 2 shows that the core is bounded at its lower part by the lower plate 14 of the core and at its upper part by the upper plate 15 of the core. These plates are pierced by openings allowing passage of the water which passes through the core in the direction and sense of the arrow 18.

In the upper part of the core casing 7, openings 19 allow passage of the water filling the reactor vessel, inside the space between the partitioning and the core casing, this water running vertically through this space, in the direction of the arrows 20.

At the upper part of the partitioning, the difference in pressure between the inner region of this partitioning and the outer region constituting the space in which the water for cooling the partitioning circulates in the direction of the arrows 20, is maximum and has a value of approximately 2 bars. In the case of a nuclear reactor including a partitioning whose joins 12 include only a small number of screws 11, in the upper part of the partitioning, jets of pressurized water pass through these joins 12 and can set up vibrations in the rods disposed outside peripheral assemblies 2 of the core disposed near these joins 12.

Joins such as 13 do not have this disadvantage since the joins 13 tend to close under the effect of the pressure and the pressurized jets capable of entering these joins are directed tangentially with respect to the rods of the neighbouring assembly.

The method of eliminating leakage spaces according to the invention is therefore essentially applied to closure of leakage spaces at the joins 12, in the case of operating nuclear reactors including a small number of screws at these joins 12.

Figure 4:
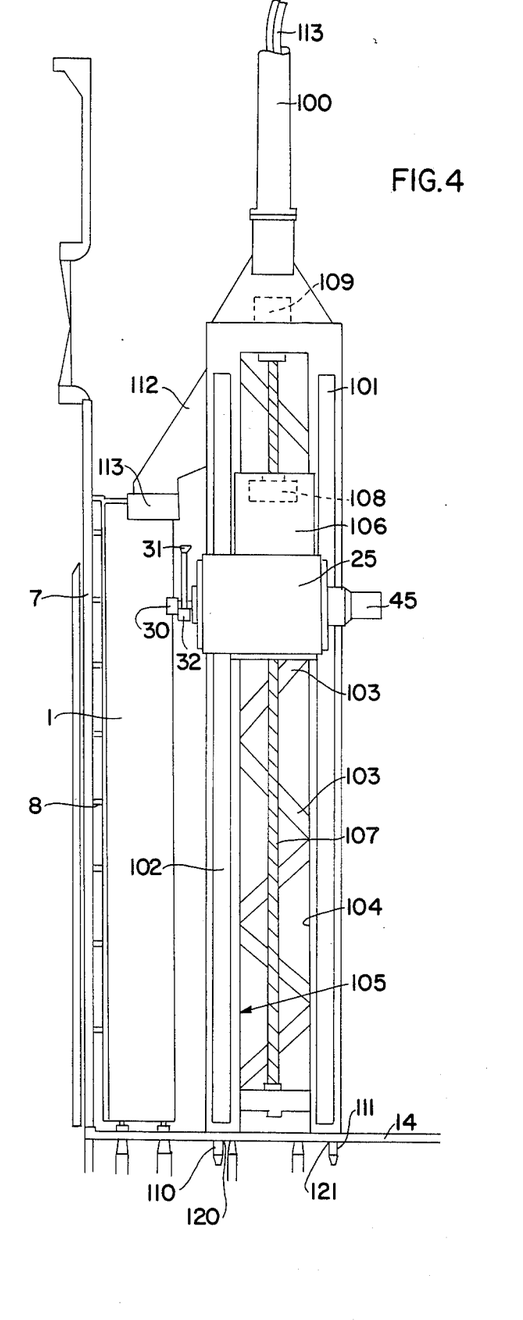
FIG. 4 shows the apparatus for eliminating leakage spaces held in working position by its support stand.
Figure 5:
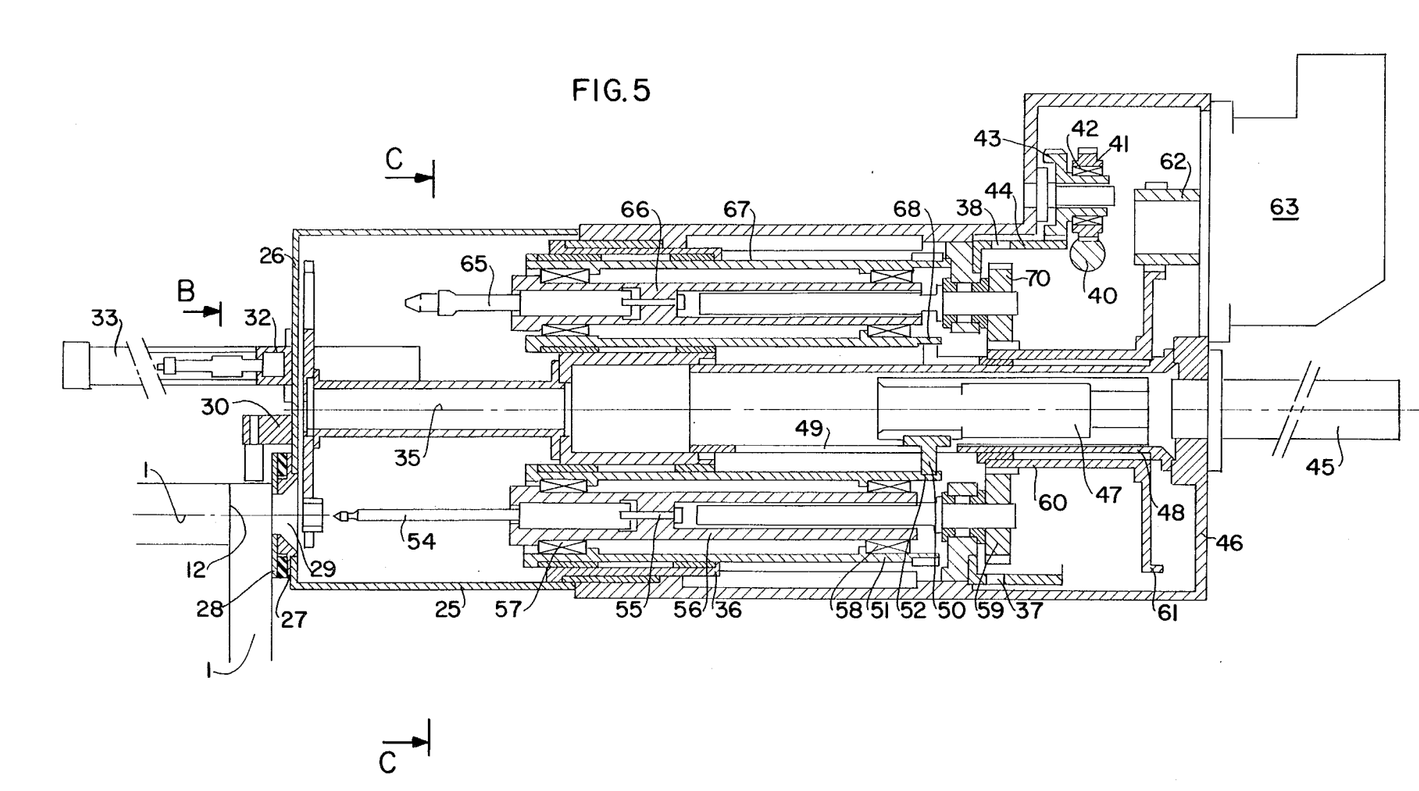
FIG. 5 is a sectional view at a horizontal plane through the apparatus for eliminating leakage spaces according to the invention, in working position at a join in the reactor partitioning.

FIGS. 4 and 5 show an apparatus allowing elimination of leakage spaces at a join 12, between two partitions 1, with the reactor core under water, during a period when the reactor is shut down.

The support stand of the apparatus, represented in FIG. 4, includes a mast 100 connected at its lower part to the two girders 101 and 102, themselves braced by tie beams 103. The faces 104 and 105 of these girders constitute a running track for a movable plate 106 whose vertical movement can be obtained by the action of the screw 107 and the nut 108. Rotation of the screw is controlled by the motor 109.

The case 25 of the apparatus is made solid with the plate 106 by a rail (not represented), which itself allows displacement in two perpendicular horizontal directions, these displacements being controlled by actuators. The girders 101 and 102 each include a stud 110 and 111 which in service are engaged in corresponding bores 120, 121 of the lower core plate 14. The support stand also includes an arm 112 provided with a yoke 113 which comes to bear on the upper edge of the partition 1. The mast 100 is hollow and serves as guiding conduit for the various cables 113 for supplying and controlling the apparatus. The mast 100 is fixed at its upper part to a hoist (not represented) fixed on a carriage positioned above the swimming pool of the reactor which is capable of being displaced in the two directions of the horizontal plane.

In a known way (not represented), this apparatus also includes a television camera allowing the joins in the partitioning which are being worked on to be identified and positioning of the apparatus at these joins to be controlled.

The apparatus is represented in FIG. 5, in working position at the join 12.

Figure 6:
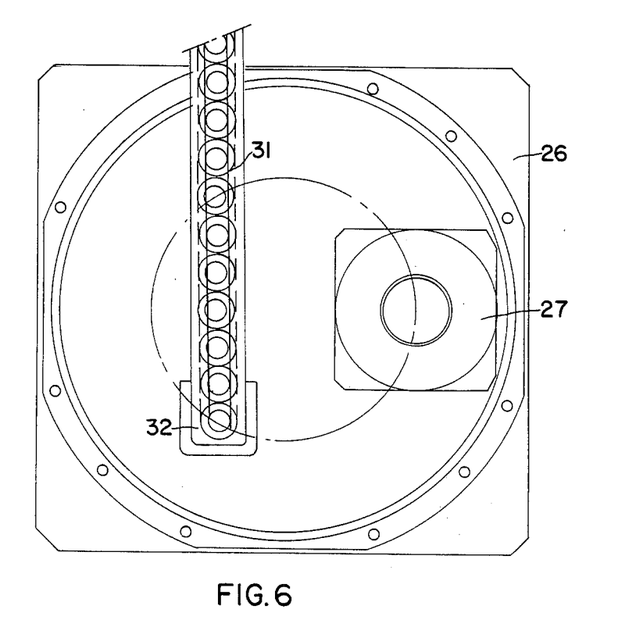
FIG. 6 is a sectional view at B of FIG. 5.

FIGS. 4, 5 and 6 show that the apparatus for eliminating leakage spaces is constituted by a case 25 bearing on its front face 26 an axial stop 27 provided with a sealing apparatus 28 at an opening 29 allowing sealed connection of this case with the partition 1 parallel to the junction 12.

The face 26 of the case also bears an adjustable side stop 30 and a vertical expansion-screw magazine 31 whose bottom part constitutes an apparatus 32 for loading screws inside the case.

An hydraulic actuator 33 is fixed to the loader 32 allowing screws to be pushed into the case, for loading.

Inside the case 25, a six-position drum 36, bearing six different tools allowing the successive operations for closing the join 12 to be carried out, is mounted to rotate about the horizontal shaft 35 of the case.

On the rear part of the drum six holes are machined, such as 37 and 38, each corresponding to the position of a tool and disposed at 60° with respect to rotation of the drum about the shaft 35.

A spring finger disposed on one of the side faces of the case 25 and controlled in its withdrawal direction by an actuator and in the other direction by the spring allows, when introduced into one of the openings such as 37 and 38, the drum to be fixed in an angular position to carry out one of the operations at the join 12.

The angular movement of the drum is controlled by a rack 40 solid with the rod of an hydraulic actuator for displacing this rack 40 in translation which drives a gear 41 mounted via a free wheel 42 on a gear 43 which itself drives a toothed crown 44 machined on the rear part of the drum 36. Operation of the free wheel 42 allows driving of the gear 43 and the drum from the movement of the rack in one direction whereas this driving is not carried out for displacement of the rod of the actuator and the rack 40 in the other direction. The length of the rack 40 allows a complete rotation of the drum to be carried out by means of moving the actuator in one direction.

The rear face 46 of the case bears an hydraulic actuator 45 whose rod is solid with a pusher 47 movable inside a guiding cylinder 48 having a window 49 over one part of its length. The pusher 47 bears a spur 50 moving inside the window 49. In FIG. 4, the spur 50 is represented in the rear position and, in this position, the sleeves such as 51, which in certain toolings are borne by the drum 36, in the working position in the case engage an opening 52 on the spur 50 so that displacement of the sleeve and the tool it contains can be achieved by means of the actuator 45. The actuator 45 can thus serve to advance the boring tools borne by the drum and withdraw them.

FIG. 5 shows two boring tools, one of which is in the working position inside the case. This boring tool is constituted by a double drill 54 including a front part for boring a pilot hole and a rear part for boring a hole in the partitions 1.

This drill 54 is fixed by a screw 55 inside a drill-holder 56 mounted to rotate inside the sleeve 51 by means of two ball bearings 57 and 58.

At its rear part, the drill-holder 56 is solid with a gear 59 engaging with a toothed wheel 60 which is itself solid with a second toothed wheel 61 engaged with a gear 62 driven by an hydraulic motor 63 borne by the rear face 46 of the case 25.

Rotating of the hydraulic motor 63 thus allows the drill 54 to be turned to bore the partitions 1, when the hydraulic actuator 45 for advance is supplied for the boring direction.

FIG. 5 also shows a second drill 65 allowing the part of the hole pierced by the drill 54 inside the first partition to be widened.

This drill 65 is solid with a drill-holder 66 mounted to rotate inside a sleeve 67 mounted in the drum 36 and having a groove 68 which comes into position on the spur 50, when the drill 65 is brought into the working position by rotation of the drum 36.

The drill 65 is rotated by the kinematic chain constituted by the crowns 60 and 61 and the gear 62 solid with the shaft of the motor 63, via a gear 70.

Figure 7:
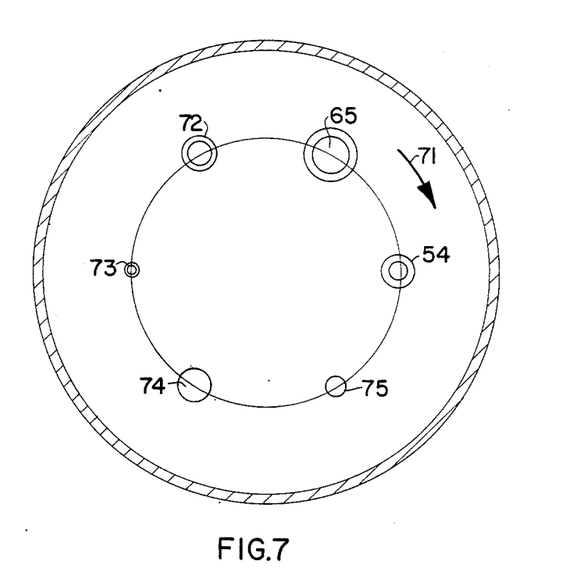
FIG. 7 is a section at C of FIG. 5.

FIG. 7 shows the position of the different tools equipping the drum. The drills 54 and 65 have already been described with reference to FIG. 5, these two tools being disposed at 60° in successive positions on the drum with respect to the direction of rotation of the latter indicated by the arrow 71.

The other tools borne by the drum, all disposed at 60° to each other, are constituted, in order of use, by the tap 72, a tube 73 for cleaning the hole after machining, a screwdriver 74 for screwing up and locking, and a punch 75 for locking the screw.

All these tools are driven by the actuator 45 and/or the hydraulic motor 63 via driving members similar to those described for the drills 54 and 65.

Figures 8, 9, 10, 11, 12:
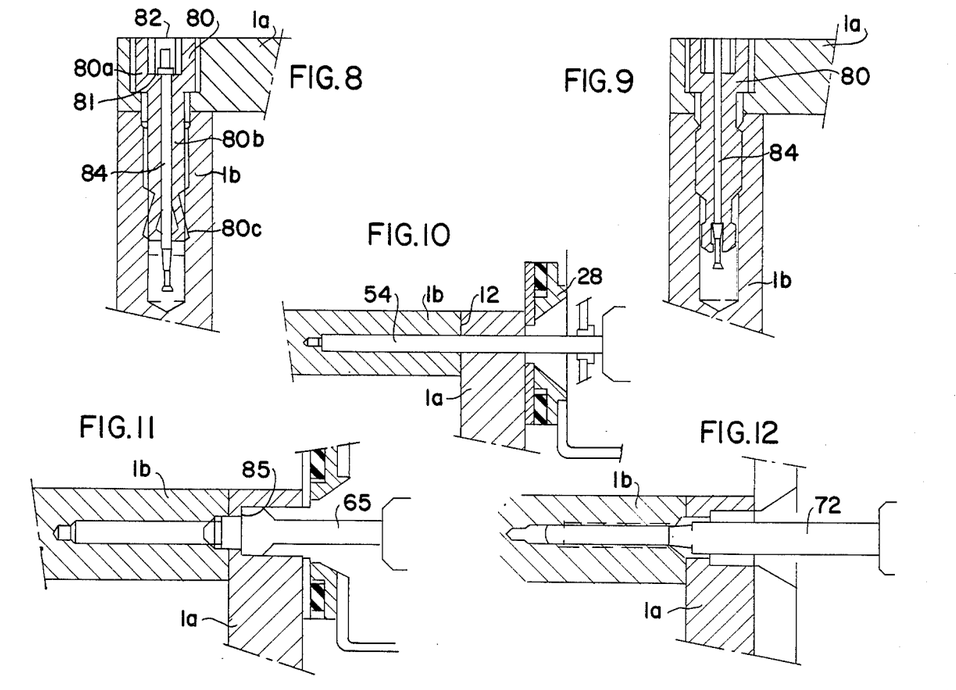
FIG. 8 is a sectional view at a horizontal plane through the join between the partitions at the assembly screw after expansion of this.
FIG. 9 is a sectional view at a horizontal plane through the join at the assembly screw, after expansion of this.
FIG. 10 is a sectional view at a horizontal plane at a join of the partitioning, during boring of this.
FIG. 11 is a sectional view at a horizontal plane at the join, during the operation of widening the bore in the first partition.
FIG. 12 is a sectional view at a horizontal plane through the join between the partitions during screw-threading of the bore, inside the second partition.

FIGS. 8 and 9 show a screw 80 for assembling the partitions 1a and 1b, this screw including a head 80a inside which an opening 82 of hexagonal section is provided, ending in a shoulder 81 intended to come to bear on the end surface of the widening of the hole in the plate 1a, a median part 80b including the thread of the screw and an end part 80c for radial expansion. This part 80c is constituted by four sectors which can be spaced apart by a control rod 84 disposed in a central bore passing through the whole screw.

In FIG. 8, the rod 84 is in the position to lock the screw while in FIG. 9 the central rod 84 is in the position before locking the screw.

To describe a complete operation of fixing a screw in the partitions 1a and 1b between which there is a leakage space 12, reference will now be made to FIGS. 10 to 15.

At the beginning of the operation, the tooling is lowered into the vessel by the hoist to which the mast 100 is hooked so that the studs 110 and 111 come to engage in the bores 120 and 121 and the yoke 113 bears on the plate 1.

Actuating the motor 109, the tooling is positioned vertically at the required level of the join of the partitions 1a and 1b which have been previously identified. Identification can be carried out by introducing shims into the various joins between the partitions so as to determine which have a leakage space to be eliminated.

The tooling is then brought into the position represented in FIG. 10 by displacement of the case 25 with respect to the plate 106, by means of actuators allowing displacement of the case in the direction of the shaft 35 of the drum and in the perpendicular horizontal direction.

The drill 54 is then brought into the working position by rotating the drum and then operated by means of the hydraulic motor 63 and the actuator 45, to make the bore through the whole thickness of the partition 1a and for a certain length in the direction of the width in the partition 1b, as represented in FIG. 9. The drill 54 is then put back in the rear position inside the case 25 before the drill 65 is brought into the working position by rotating the drum by 60°. For each drum position, the spring locking finger allows the tooling to be kept exactly in position in the centre of the opening 29 of the case 25.

As FIG. 11 shows, the drill 65 allows the hole inside the plate 1a to be widened and the bearing surface 85 for the screw head to be made.

As FIG. 12 shows, the tap 72 allows the hole inside the plate 1b to be machined over a certain length for screwing a joining element such as the screw 80.

The drills 54 and 65 and the tap 72 are rotated by means of the hydraulic motor 63 and they are moved forward by means of the actuator 45.

Figure 13:
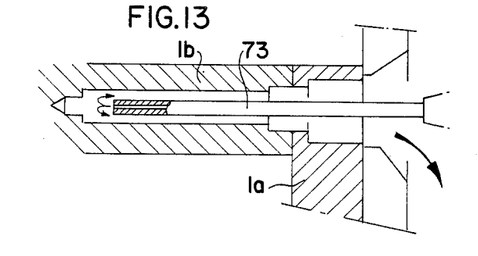
FIG. 13 is a sectional view of the join during the operation of recovering the swarf.
Figure 14:
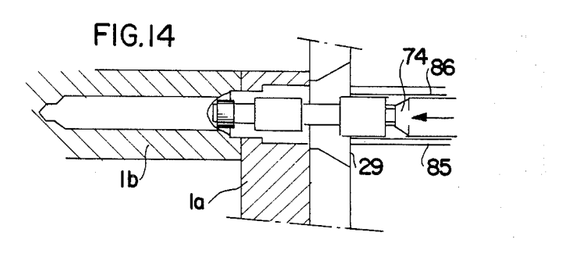
FIG. 14 is a sectional view of the join, during the operation of positioning the tightening screw.

FIG. 13 shows the cleaning tube 73 brought into working position by means of the actuator 45 inside the bore, its outlet end being disposed near the bottom of the hole pierced inside the plate 1b.

A pressurized water supply connected to the case 25 allows a jet of pressurized water to be sent into the hole via the cleaning tube 73 which drives the swarf from the partitions to be recovered inside the case which is kept under slightly lower pressure. In practice, it is necessary to avoid metal particles remaining in the reactor vessel where they could be entrained to any point in the primary circuit when the reactor is restarted. During boring of the hole by means of the drill 54, a screw 80 is supplied in its transporting tube 86 shown in FIG. 13. This transporting tube 86 is mounted solid with the drum and the screwdriver 74 slides inside this tube 86, by means of the actuator 45. When the tube 86 and the screwdriver 74 are brought into the working position opposite the hole 29 in the case 25 in alignment with the hole pierced in the partitions, the screw is simply pushed, by means of the screwdriver 74 which is engaged in the opening in the screw head, up to a position which allows screwing of it inside the hole in the partition 1b to be started. Screwing is then continued by rotation of the screwdriver 74 until the leakage space between the two partitions at the screw 80 has been eliminated or reduced so as to avoid any leaking of pressurized water.

Figure 15:
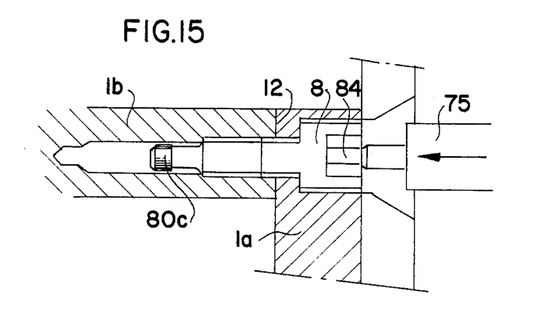
FIG. 15 is a sectional view at a horizontal plane, at the join, during the operation of expanding the screw.

The punch 75, as represented in FIG. 15, is then brought into working position.

The actuator 45 acting on the punch 75 allows the rod 84 to be moved forward into the position represented in FIG. 8 where this rod spaces apart the sections of the end part 80c of the screw so as to lock it inside the hole in the partitions 1a and 1b. The outer surface of the end part 80c of the screw has toothing allowing an improved locking of this screw in the axial position.

Any risk of the screw 80 unscrewing while the nuclear reactor is working can thus be avoided, without a welding operation being required to lock this screw against rotation.

When the set of operations for fixing a screw has been completed, the machining head is displaced with respect to the movable plate so as to move this tooling away from the partitions and bring it into a new vertical position along the stand which allows machining and fixing of a screw 80 at another location on the join between the partitions 1a and 1b.

The leakage space between these partitions can thus be completely eliminated by positioning the screws with a certain spacing in the vertical direction.

When the operation for the join between the partitions 1a and 1b has been completed, the tooling is displaced to another join between two other partitions where a leakage space has been found to exist.

Figure 16:
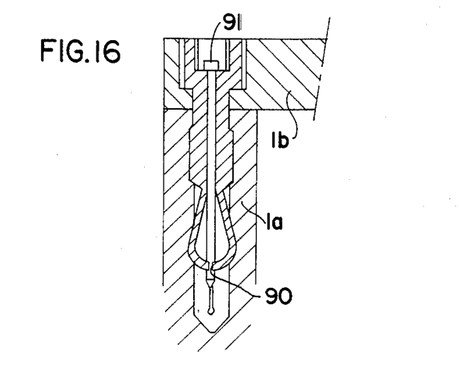
FIG. 16 is a sectional view of the join between the partitions, with an assembly screw made according to a variant.

FIG. 16 shows a variant embodiment of the screw for fixing the partitions. The end of the rod 84' includes a groove 90 in which the end of the sectors comes to engage constituting the end part 80'c of the screw which acts as axial locking spur for this rod with respect to the screw. Thus, no sliding is possible between the rod 84 and the screw 80.

The upper end of the rod 84 also includes an enlargement 91 which allows retention of the screw head 80a even if the median part 80b of the screw breaks.

The principal advantages of the method and apparatus according to the invention are clearly that they allow play between the partitions of the core of a nuclear reactor already in service to be definitely eliminated, since all the operations can be carried out under water and at a distance, without introducing metal particles inside the vessel of the reactor from the operations of machining the partitions.

In addition, fixing of the screws on the partitions is highly reliable and highly efficient as regards elimination of play so that there is no longer any necessity to check the joins between the partitions of the core, after this operation has been carried out.

The invention is not, however, limited to the embodiment described; it includes all the variants thereof.

Thus, expansion screws differently shaped to those described are conceivable. Use of a tooling for boring the partitions and positioning and locking the screws different to a drum tooling is also conceivable. In addition, in the drum tooling as described, the number of working positions of the drum can be other than six and a seven-position drum can be used for arranging seven tools, for example. This solution allows two taps to be used, for example.

Lastly, the use of the method and apparatus according to the invention is conceivable in the case of any pressurized water nuclear reactor already in service and whose partitions may have leakage spaces.

I claim:

1. Method of eliminating leakage spaces between the partitions (1) surrounding the core of a pressurized water nuclear reactor after bringing into operation of this reactor whose core constituted by vertically disposed prismatic fuel assemblies (2) is surrounded over its entire height by vertical flat partitions (4) joined at right angles in pairs so as to constitute a partitioning whose horizontal section inside the circular section of the cylindrical casing of the core is a polygon contiguously surrounding the core whose horizontal section is correspondingly shaped, the partitions being assembled by horizontal reinforcing pieces (8) disposed between the outer surface of the partitions (1) and the inner surface of the casing (7) pierced by openings allowing water to circulate, vertically, in the space provided between the partitioning and the core casing, comprising the steps, during a reactor shutdown, with the core under water, of (a) identifying the joins between two right-angled partitions (1a, 1b) between which a leakage space is liable to create a leakage of cooling water, while the reactor is operating, in the direction of the core, and then, in the case of each join, (b) making a first bore in the two partitions (1a, 1b) where they join, such that the bore passes through the whole thickness of one (1a) of the two partitions and opens into the other partition (1b), in the direction of its width, (c) widening the bore in the first partition (1a) to form a housing with a bearing surface perpendicular to the bore, (d) screw-threading the interior of the bore over part of its length inside the second partition, (e) recovering the swarf, (f) introducing a screw (80) with diametrical expansion and screwing said screw into the bore until a tightness reducing the play at the screw is obtained and the screw head bears on the bearing surface inside the housing, (g) expanding the screw (80) by displacement of a rod (84) inside said screw in the longitudinal direction, (h) repeating operations (b) to (g) at certain locations along the joint between the two partitions (1a, 1b) until the leakage space is insignificant, and then at the other identified joins.

* * * * *